United States Patent [19]

Haney

[11] 4,064,945
[45] Dec. 27, 1977

[54] ELECTRONIC DEPTH CONTROL SYSTEM
[75] Inventor: Robert M. Haney, Rockford, Ill.
[73] Assignee: J. I. Case Company, Racine, Wis.
[21] Appl. No.: 556,531
[22] Filed: Mar. 10, 1975
[51] Int. Cl.² .......................................... A01B 63/114
[52] U.S. Cl. .......................................... 172/4; 172/7; 172/9
[58] Field of Search .................. 37/DIG. 1, DIG. 14, 37/DIG. 20; 172/2, 4, 4.5, 7, 9, 11; 280/446 A, 456 A, 490 A; 318/587, 606, 607; 340/195

[56] References Cited
U.S. PATENT DOCUMENTS

| | | | |
|---|---|---|---|
| 3,026,638 | 3/1962 | Hayner et al. | 318/587 X |
| 3,058,242 | 10/1962 | Ocnaschek | 172/4.5 |
| 3,437,920 | 4/1969 | Anderson | 340/195 X |
| 3,454,101 | 7/1969 | Breitbarth et al. | 172/4.5 |
| 3,516,498 | 6/1970 | Schowalter | 172/9 |
| 3,860,074 | 1/1975 | Maistrelli | 172/7 |
| 3,896,899 | 7/1975 | Scholl | 172/4.5 |

*Primary Examiner*—William H. Grieb
*Assistant Examiner*—Vance Y. Hum
*Attorney, Agent, or Firm*—Dressler, Goldsmith, Clement, Gordon & Shore, Ltd.

[57] ABSTRACT

An electronic control system for controlling the depth of a vehicle drawn implement as a function of a plurality of sensed variables including a plurality of transducers one for sensing the value of each of the variables, and an electronic control circuit for initially generating a pulsating signal having a characteristic which varies in accordance with and is representative of the value of each variable, for converting that variable to a variable amplitude signal, for algebraically adding the various signals and for producing a control signal to operate an electrically operated valve in response to the polarity and amplitude of the signal to selectively raise and lower the implement to the desired depth.

10 Claims, 7 Drawing Figures

ELECTRONIC DEPTH CONTROL SYSTEM

BACKGROUND OF THE INVENTION

The present invention relates generally to draft control systems for tractor or vehicle drawn implements and more particularly to an improved electronic control system for automatic position control and/or draft control of the implement with respect to the vehicle to which it is attached.

One of the most common present day systems for connecting an implement to a tractor is known as a three-point hitch. The three-point hitch consists of a pair of draft arms that provide the connection between the implement and the tractor and a rock arm connected to a rock shaft and also to the draft arms through links. The rock shaft is positioned by a hydraulic motor. Fluid is selectively admitted to the hydraulic motor through a valve which is actuated in response to changes in the draft forces on the draft arms, the manual positional setting of the system and the position of the rock shaft. Heretofore, most of the systems that are commercially available consist of a strictly mechanical sensing system for sensing changes in draft load, the position of the rock shaft and the position of a manual control lever. These mechanical systems become extremely complicated and require a substantial amount of maintenance.

As such, many recent efforts have been directed toward development of an electronic system for controlling the hydraulic valve which supplies fluid to the hydraulic motor. Examples of such devices are shown in U.S. Pat. Nos. 3,516,498 and 3,814,188.

So far as presently known, most systems that have been proposed rely primarily upon signal amplification for measuring changes in the various parameters of the system. In other words, a signal is developed from the various sensing devices, and the signals are combined and amplified to produce an output signal. When the combined output signal exceeds a certain level, a control valve is actuated to make a correction. However, these systems have lacked reliability and the requisite sensitivity to measure small changes in the respective parameters.

SUMMARY OF THE INVENTION

In accordance with the present invention, there is provided an improved electronic control system and method for producing and providing the desired depth and draft control relatively simply, reliably and efficiently.

In accordnce with the present invention, a plurality of signals are produced representing the values of the variables to be measured such as desired draft position, actual position and draft load. The various values are sensed by suitable transducers which in conjunction with the system and method incorporating the present ivnetion provide signals having a characteristic which is representative of which varies in accordance with the value of the variable being sensed.

Each signal is processed to produce a control signal to actuate an electrically controlled hydraulic valve which operates one or more hydraulic motors to adjust the draft of the implement.

More specifically, in accordance with the present invention one variable inductance transducer senses the position of a manual control lever which sets the desired position of the implement, a second such transducer senses the actual position of the implement and a third transducer senses the effective draft load. These variable inductance transducers each form a part of an oscillator circuit and the inductance of each transducer, which is porportional the the value of the variable sensed, effectively modulates the output of the oscillator to produce a signal having a characteristic which varies in accordance with and proportionally to the changes in values of the variables being measured.

For example, the change in inductance may effect either an amplitude or frequency modulation of the oscillator output. In one disclosed embodiment, the output is a frequency modulated signal which is converted into a plurality of constant amplitude constant width pulses having a pulse repetition rate which varies in accordance with the frequency of the oscillator output and therefore in accordance with the value of the variable sensed.

The average amplitude of the pulse train, which is a function of the pulse repetition rate, is determined and a variable amplitude signal having an amplitude corresponding thereto is generated. The variable amplitude signals are algebraically combined to produce an error signal having an amplitude and polarity determined by the algebraic sum of each of the individual variable amplitude signals. A control signal is generated when the amplitude of the error signal reaches a predetermined level and is applied to one of the solenoids of the solenoid operated valve to effect desired operation of the hydraulic motor means to adjust the draft of the implement.

Numerous other advantages and features of the present invention will become readily apparent from the following detailed description of the invention and of one embodiment thereof, from the claims and from the accompanying drawing in which each and every detail shown is fully and completely disclosed as a part of this specification in which like numerals refer to like parts.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

Figure 1:
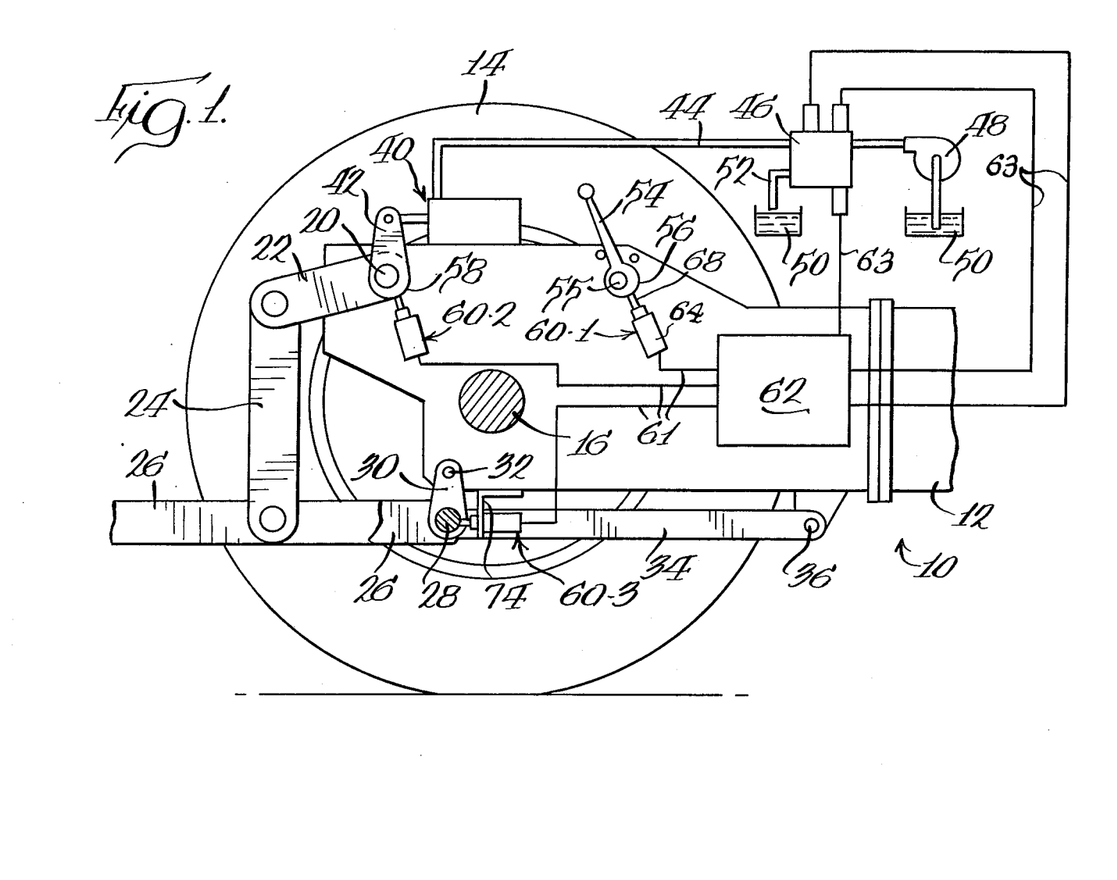
FIG. 1 schematically illustrates a portion of a vehicle and a draft sensing mechanism.

FIG. 1 of the drawings schematically illustrates a portion of a conventional tractor or vehicle 10 including a housing 12 supported on rear wheels 14 that are connected to opposite ends of a rear axle 16. A rock shaft 20 extends generally parallel to axle 16 and is rotatably supported on housing 12 that forms part of vehicle 10. Rock shaft 20 has a pair of rock arms 22 (only one being shown) fixed thereto and each rock arm is connected through a link 24 to a draft arm or link 26. An earthworking implement (not shown) is attached to the rear ends of the two draft arms while the forward ends are interconnected by a cross shaft or member 28. Cross shaft or member 28 is supported for movement with respect to vehicle 10 by a pair of transversely spaced links 30 (only one being shown) pivotally supported on vehicle 10 by pins 32. A spring mechanism or biasing mechanism 34 has one end secured to member or cross shaft 28 while the opposite end is connected to vehicle 10 by a pin 36. Biasing mechanism 34 is preferably of the type disclosed in Engelmann U.S. Pat. No. 3,375,876. Biasing mechanism 34 normally biases member 28 to a forward most position and accommodates rearward movement of member 28 as the draft load on the implement increases.

The position of rock shaft 20 is controlled by a hydraulic motor 40 connected to rock shaft 20 by an arm 42. Hydraulic fluid is supplied to motor 40 through a conduit 44 connected to a control valve 46 which has pressurized fluid supplied thereto by pump means 48 drawing fluid from a reservoir 50. Reservoir 50 is also connected to control valve 46 through a further conduit 52. Thus, pressurized fluid may be supplied to one end of hydraulic motor or ram 40 by actuation of the control valve 46. Alternatively fluid may be forced from hydraulic ram to the reservoir when the control valve is actuated. The fluid is forced from the ram by the weight of the implement.

The draft sensing system also incorporates a manual control lever 54 which is pivotally supported on vehicle 10 to set the desired position and/or draft load on the vehicle through circuitry that will be subsequently described. Control lever 54 has a member movable therewith for indicating the position of the control lever with respect to vehicle 10. In the illustrated embodiment, the movable member consists of a camming surface 56 that is eccentric with respect to the axis of pin 55 which supports control lever 54. Also, rock shaft 20 likewise has a camming surface 58 that is eccentric to the axis of the rock shaft and defines a member that is movable therewith to indicate the position of the rock shaft with respect to the vehicle.

According to the present invention, the positions of the rock shaft 20, draft arms 26 and control lever 54 with respect to vehicle 10 are all sensed by unique sensing devices 60 which are identical in construction to each other and are identified in the drawing by the numbers 60-1, 60-2 and 60-3. The sensing devices 60 are part of an electronic control circuit 62 which produces continuous signals that are fed by lines 61 through the sensing devices. The sensing devices vary these output signals as a function of changes and the electronic control circuit produces a control signal that actuates control valve 46.

Each sensing device 60 may be identical in construction. One example of a sensing device suitable for use with the present invention is a variable inductance transducer of the type disclosed in a co-pending application of Lewis G. Schowalter entitled "Sensing Mechanism for Draft Control System", Ser. No. 556,587, filed Mar. 10, 1975, now U.S. Pat. No. 3,994,348. Electronic control circuit 62 actuates control valve 46 through lines 63. Control valve 46 is preferably solenoid operated and may be of the type disclosed in the copending application of Lewis G. Schowalter entitled "Control Valve for Draft Control System", Ser. No. 556,589, filed Mar. 10, 1975, now U.S. Pat. No. 3,994,347. Such a sensing device 60 is a variable inductance transducer including a coil (not shown) within a housing 64 and a plunger 68 that is movable with respect to the coil. Biasing means (not shown) normally biases the outer free end of plunger 68 into engagement with a member, such as member 28, or cams 56, 58.

In the installation of the respective sensing devices 60, the devices are positioned so that each plunger 68 is in an intermediate position with respect to housing 64 and is held in engagement with an associated member by the biasing means.

Considering now the operation of the draft sensing system, manual control lever 54 is initially rotated to produce a desired setting of the draft arms 26 with respect to the vehicle 10. Movement of control lever 54 will move camming surface 56 and cause an axial shifting of plunger 68 with respect to coil to vary the signal which is produced by control circuit 62 through line 61. This signal is translated and actuates control valve 46 and produces a desired setting of draft arms 26 by rotating rock shaft 20. As rock shaft 20 is rotated, a plunger associated therewith moves with respect to its associated coil and at the same time the plunger 68 of the sensing device 60 associated with draft arms 26 is moved with respect to its associated coil.

The variations in the signals on lines 61 are produced by the relative movements of the plungers with respect to associated coils. When the desired setting of the draft arms have been reached, the control circuit 62 will neutralize control valve 46. Thus, a desired setting for rock shaft 20 and draft arms 26 has been reached. Assuming that the electronic control circuit 62 is set for sensing changes in draft load, any movement of cross shaft or member 28 forwardly or rearwardly with respect to vehicle 10, which would be respectively produced by decreases and increases in draft load on draft arms 26, will result in a shifting of the associated plunger with respect to its coil and vary the signal to electronic control circuit 62. This signal is combined with the two signals received from the remaining two sensing devices and makes a corresponding correction by actuating one of the solenoids cooperating with control valve 46.

The system, of course, can also be adjusted so that the draft arms are held in a predetermined position with respect to vehicle 10 without regard to the actual load on the implement. This is accomplished within electronic control circuit 62 by deactivating the signal from a sensing device associated with draft arms 26 and by actuating control valve 46 only in response to changes in the position of manual control member 54 and rock shaft 20.

Figures 2, 3:
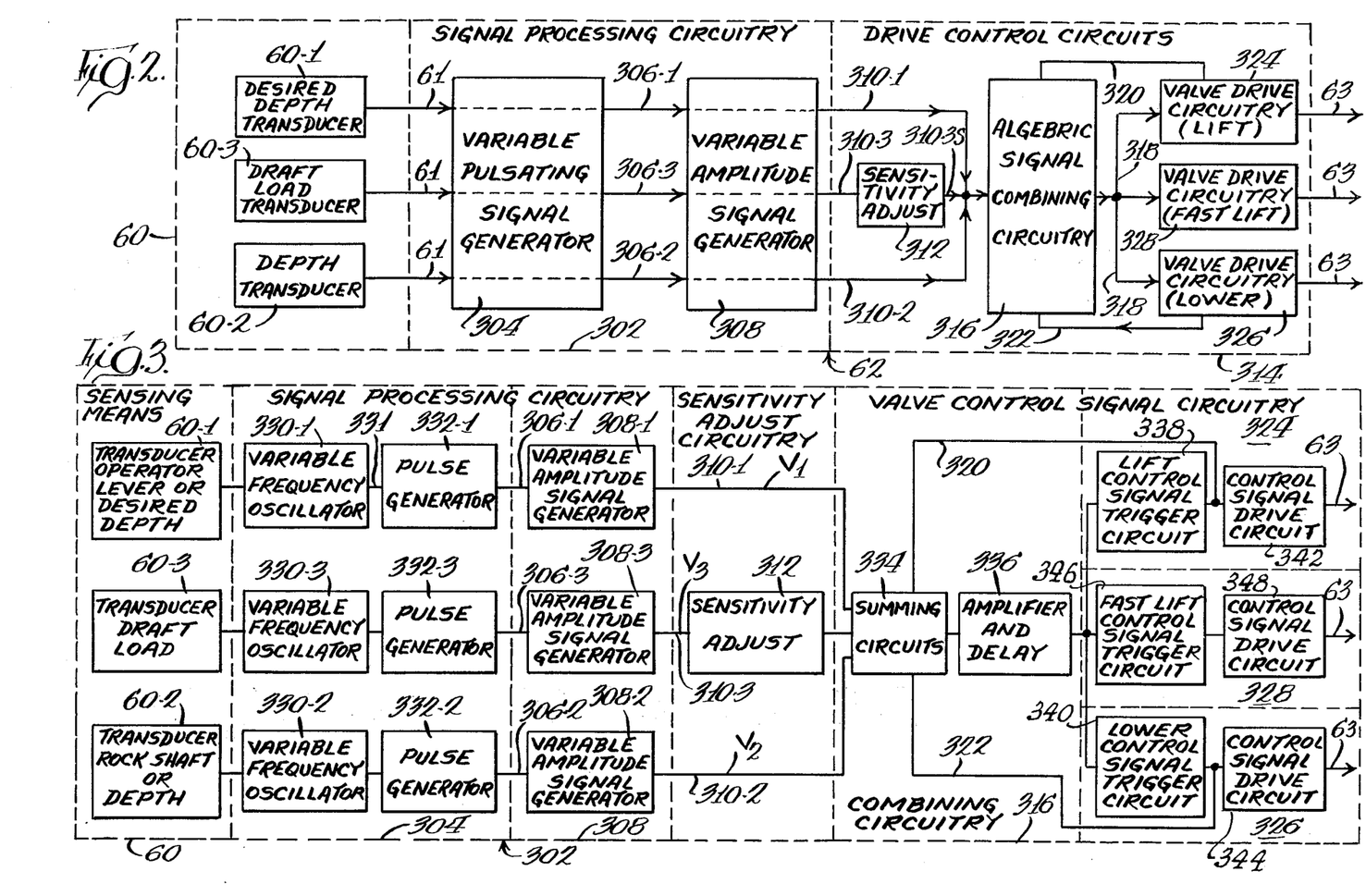
FIG. 2 is a block diagram of an electrical control system incorporating the present invention.
FIG. 3 is a more detailed block diagram of one embodiment of an electrical control system incorporating the present invention.

A block diagram of the control system 62 incorporating the present invention is shown in FIG. 2. The system includes signal processing circuitry 302 connected to each of the plurality of sensing transducers 60, each of which senses the value of variable. As explained above, one transducer 60-1 senses desired depth, a second transducer 60-2 senses actual depth, and a third transducer 60-3 senses draft load.

The signal processing circuitry 302 includes pulsating signal generator 304 which in conjunction with the transducers 60 produces on lines 306-1, 306-2 and 306-3 a plurality of pulsating signals each one of which has a characteristic which is representative of and which varies as a function of the value of the variable sensed by the corresponding transducer 60-1, 60-2 and 60-3, respectively. The signal generator 304, for example, may be one which in effect produces an amplitude modulated signal of fixed frequency in which the amplitude of this pulsating signal varies in proportion to the inductance of a corresponding transducer 60. Alternatively, the signal generator 304 may be one which in effect produces a frequency modulated fixed amplitude pulsating signal having a frequency which varies in proportion to the inductance of a corresponding transducer 60.

The outputs 306 of the variable pulsating signal generator 304 are applied to a variable amplitude signal generator 308 which produces on each of its output lines 310-1, 310-2 and 310-3 a signal having an amplitude which varies in accordance with the variable characteristic of the signal produced by the variable pulsating signal generator 304. As a result the amplitude of each of the signals generated by the variable amplitude signal generator 308 is representative of and varies as a function of the value of the variable sensed by each of the corresponding transducer 60-1, 60-2 and 60-3.

One or more of the variable amplitude signals on lines 310, for example, the draft load signal on line 310-3, may be connected to a sensitivity adjust circuit 312 which is operable to alter the effect of this signal on the drive control circuits 314 and thereby alters the response of the system to this signal.

The variable amplitude signals are applied to the input of the drive control circuits 314. Drive control circuits 314 include combining circuitry 316 which produces as its output 318 a signal having an amplitude and polarity which is a function of the algebraic sum of the variable amplitude signals on lines 310-1, 310-2 and 310-3 as well as the feedback signals on lines 320 and 322 explained in more detail below.

The output of the algebraic signal combining circuitry 316 is connected to a plurality of valve drive circuits, lift valve drive circiut 324, lower valve circuit 326 and fast lift drive circuit 328, each of which when energized produces a control signal to operate the solenoid control valve 46 and thereby operate the hydraulic motor 40 as described above.

FIG. 3 is a more detailed block diagram of one embodiment of the system shown in FIG. 2, and FIGS. 4a, 4b and 4c together show a schematic diagram of the system of the FIG. 3. The variable pulsating signal generator 304 includes variable frequency oscillators 330 and pulse generators 332, there being one oscillator 330-1, 330-2 and 330-3, and one pulse generator 332-1, 332-2 and 332-3 for each transducer 60-1, 60-2 and 60-3, respectively. Since each of the oscillators 330 and each of the pulse generators 332 are identical, the schematic diagram of FIG. 4a discloses the circuitry for only one of each as well as only one of the three variable amplitude signal generators 308-1, 308-2 and 308-3 which also are identical.

Figure 4A:
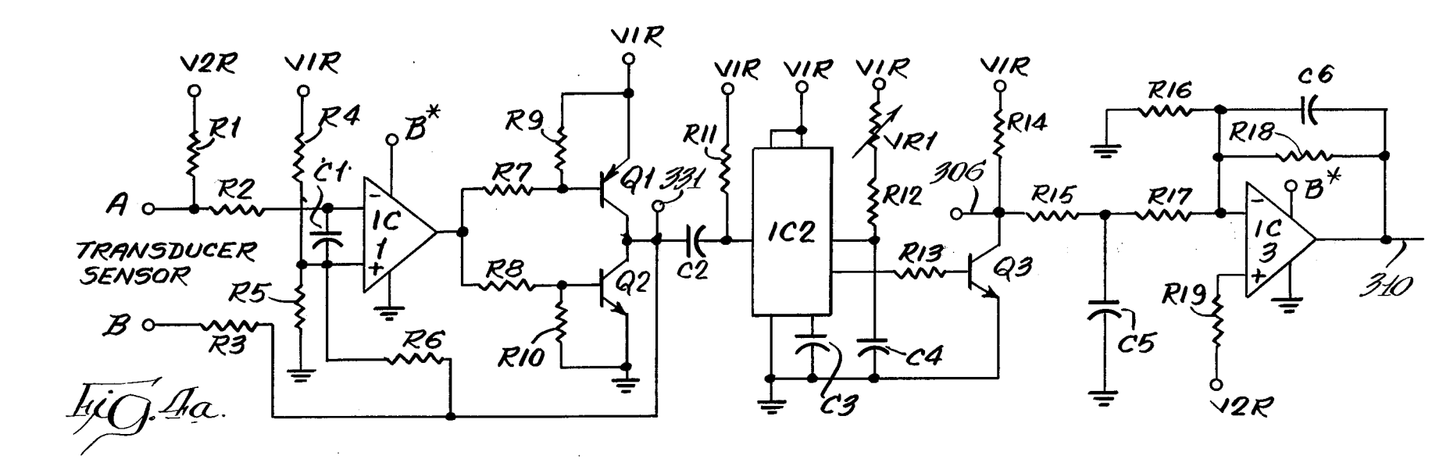
FIGS. 4a, 4b and 4c taken together show a schematic diagram of an electrical control system shown in FIG. 3.

Each of the variable inductance transducers 60 forms part of the circuit of one variable frequency oscillator 330 which includes (See FIG. 4a) integrated circuit IC-1, transistors Q1 and Q2, and resistors R1-R10. Oscillator 330 produces at its output 331 a signal having a frequency proportional to the inductance of the transducer 60. The oscillator circuit shown in FIG. 4a is a level detector with hysteresis in which the inductance of the transducer 60 and the resistance of resistor R1 determines the rate at which the oscillator circuit switches between its two levels or states. The transistors Q1 and Q2 provide an output signal having sufficient amplitude to drive the coil without saturation of the integrated circuit IC-1. The output of the level detector oscillator circuit 330 is a square wave the frequency of which is proportional to the plunger position of the transducer 60.

In the illustrated embodiment, movement of the control lever 54 to raise the implement increases the inductance of the transducer 60-1 and therefore the frequency of the oscillator output 331-1. Similarly, raising the implement similarly causes an increase of the inductance of the transducer 60-2 to increase the frequency of the variable oscillator output 331-2. A third transducer 60-3 senses movement of the cross shaft or member 28 and as load increases the inductance of the load sensing transducer 60-3 drops causing a decrease in the frequency of the oscillator output 331-3.

The output of each oscillator 330 is connected to the input of a pulse generator 332. The pulse generator circuit shown in FIG. 4a is a monostable multivibrator which consists of integrated circuit timer IC-2, transistor Q3, resistors R11-R13, variable resistor VR1 and capacitors C2-C4. Coupling capacitor C2 produces a negative pulse to the trigger input of integrated circuit IC-2 each time the square wave output of the oscillator 330 switches to its low value. This results in the timer output switching to its high state, to produce a constant amplitude pulse for a fixed time interval dependent on the resistance of resistors R12 and VR1 and the capacitance of capacitor C4. At the end of the time interval the output of timer IC-2 returns to its low level until once again it receives a negative impulse at its trigger input.

Thus, the output 306 of pulse generator 332 is a pulse train in which each of the pulses has a constant amplitude and constant width and has a repetition rate equal to the frequency of the output 331 of the variable frequency oscillator 330 as determined by the inductance of the corresponding transducer 60.

The average voltage of the pulse train output 306 of the pulse generator 332 is proportional to the pulse repetition rate. The variable amplitude signal generator 308 or low pass filter includes integrated operational amplifier IC-3, resistors R14-R19, and capacitors C5 and C6, and provides an output the amplitude of which is the average of the voltage of the pulse train generated by the pulse generator 332.

Thus, the output in each channel of the signal processing circuitry 302 is a signal having dc voltage amplitude which is proportional to the frequency of the corresponding variable frequency oscillator which in turn is determined by the value of the sensed variable. The voltage V1 on line 310-1 is proportional to the position of the control lever 54 and, the voltage V2 on line 310-2 is proportional to the sensed depth.

Figure 4B:
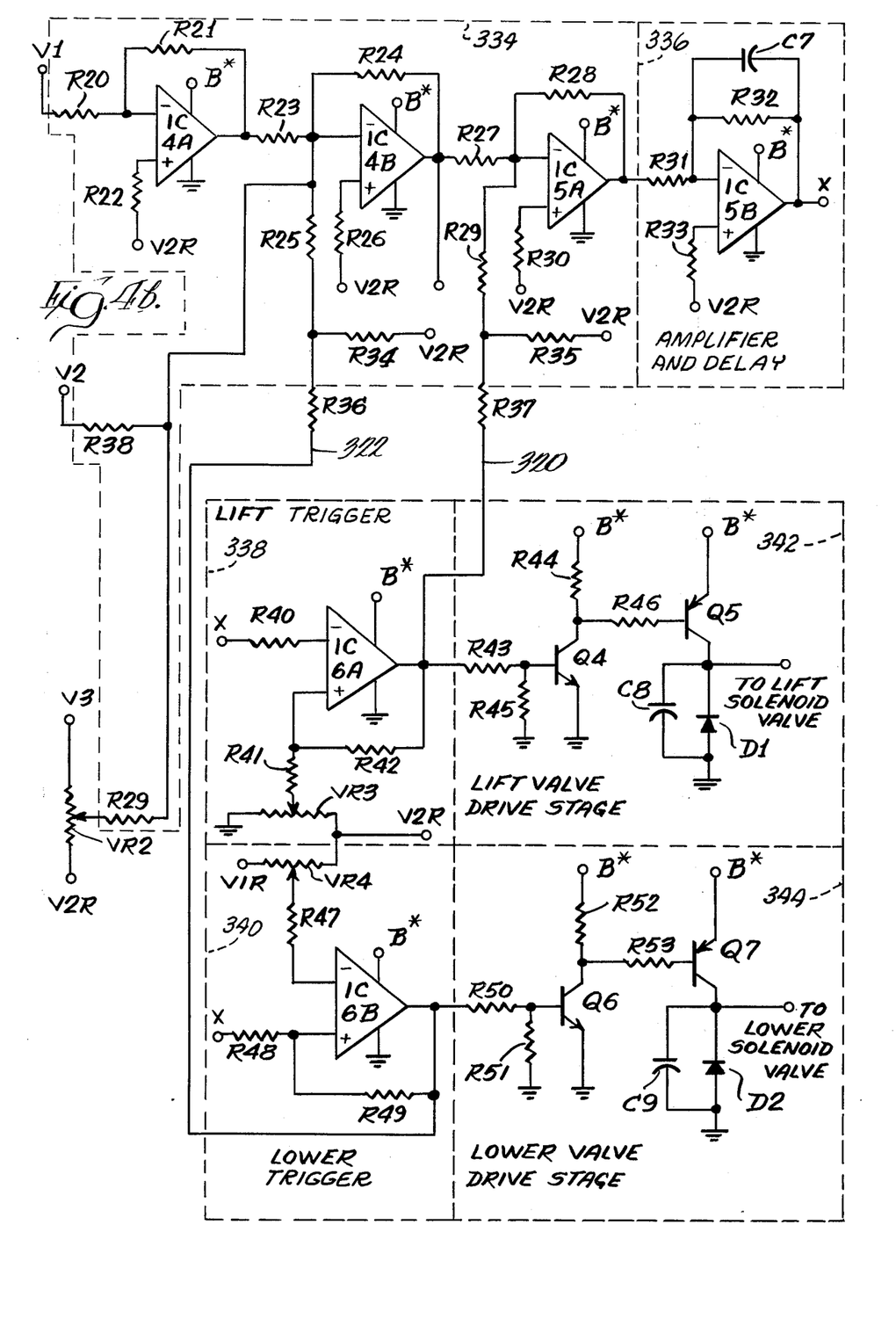
Figure 4C:
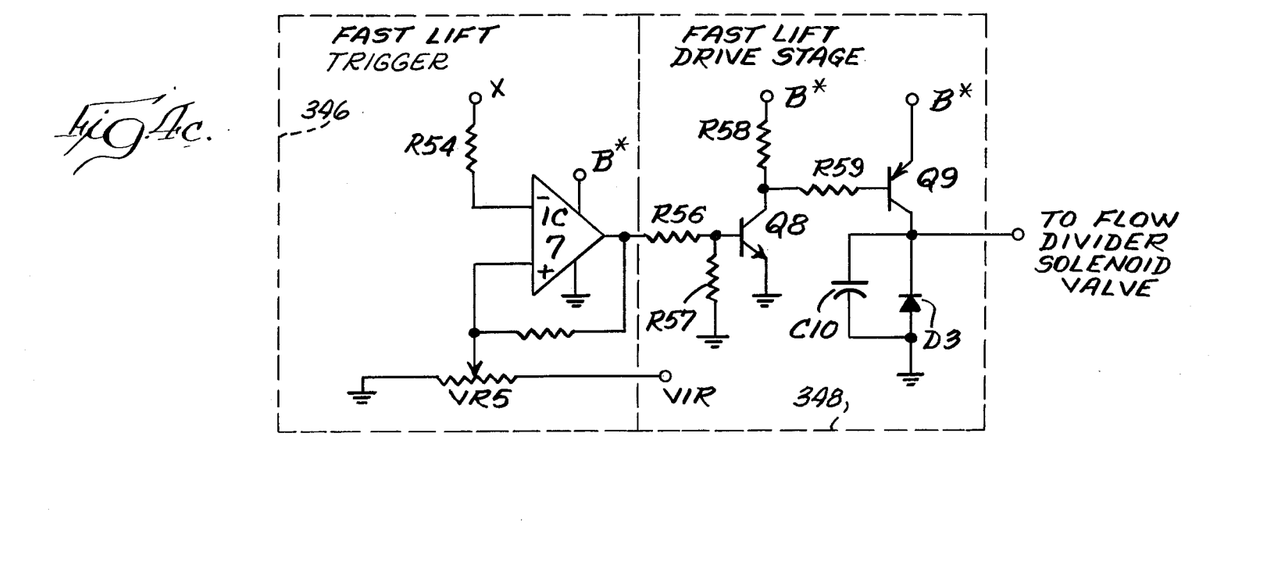

As indicated above, it is not always desirable or necessary to have the control system respond to the draft load signal and it is often desired to adjust the sensitivity of the system to the draft load signal V3. Therefore, the output of variable amplifier signal generator 308-3 is connected to sensitivity adjust circuit 312 which as seen in FIG. 4b consists of variable resistor VR2. By varying the tap any percentage of the draft load signal between 0% and 100% may be applied to the input of the summing circuits 334.

These three variable amplitude signals are connected to combining circuitry 316 which includes summing circuits 334 and an amplifier and delay circuit 336. The summing circuits 334 (See FIG. 4b) of integrated circuits IC-4A, IC-4B, and IC-5A, resistors R20–R30 and R34–R39 effects an algebraic addition of each of the variable amplitude signals V1, V2, and V3 which are representative of the values of the variables sensed, as well as the feedback signals on lines 320, 322 from the output of the trigger circuits 338, 340. The feedback signals provide anticipation of the depth indicating signal V2 to minimize system instability and hunting without a corresponding increase in noise amplification.

The combined signal, the output of IC-5A is applied to the input of amplifier and delay circuit 336 which amplifies the combined or error signal. The amplifier and delay circuit includes IC-5B, resistors R31–33, and capacitor C7. The ratio of resistor R32 to R31 and the time constant determined by R32 and C7 and determine the system sensitivity and stability. The output of the amplifier and delay stage 336 is an "error" signal having an amplitude and polarity determined by the algebraic sum of the three variable amplitude signals as well as the feedback signals, and which is indicative of the difference between the desired depth and the draft load on one hand and the actual depth and the feedback signal on the other.

When the error signal is negative and exceeds a preselected amplitude it activates lift trigger circuit 338, which includes integrated circuit IC-6A, resistors R40–R42 and variable resistor VR3. The activated trigger circuit 338 produces a trigger signal to energize the control signal drive circuit 342. The trigger signal is also fed back to the summing circuit on line 320. The trigger circuit 338 exhibits a hysteresis characteristic so that it produces a trigger signal when the input of proper polarity and selected amplitude is applied thereto and is deenergized to remove the trigger signal when the input amplitude drops to a different lower level.

The control signal drive circuit 342 for the valve lift solenoid includes transistors Q4 and Q5, resistors R43–R46, capacitor C8 and diode D1. When a trigger signal is applied to the base of transistor Q4, the transistor is saturated grounding the base of transistor Q5, turning the transistor Q5 on and providing a voltage or control signal to the valve solenoid.

The lower trigger circuit 340 consisting of IC6B, resistors R47–R49, and variable VR4 is essentially the same as the lift trigger circuits 338 except that it produces a trigger signal in response to a signal of opposite polarity which is indicative of an error signal representative of the fact that the implement should be lowered to energize lower control signal drive circuit 344 which consists of transistors Q6 and Q7, resistors R50–R53, capacitor C9 and diode D2.

The fast lift trigger circuit 346 consisting of IC-7 resistors R54 and R55 and variable resistor VR5 is identical to the lift trigger circuit 338 but produces a fast lift trigger only signal in response to an error signal having a greater amplitude than required to activate lift trigger circuit 338 to energize fast lift control drive circuit 348 to produce a control signal applied to another solenoid of the solenoid control valve to increase the lift rate of the hydraulic motor.

Figure 5:
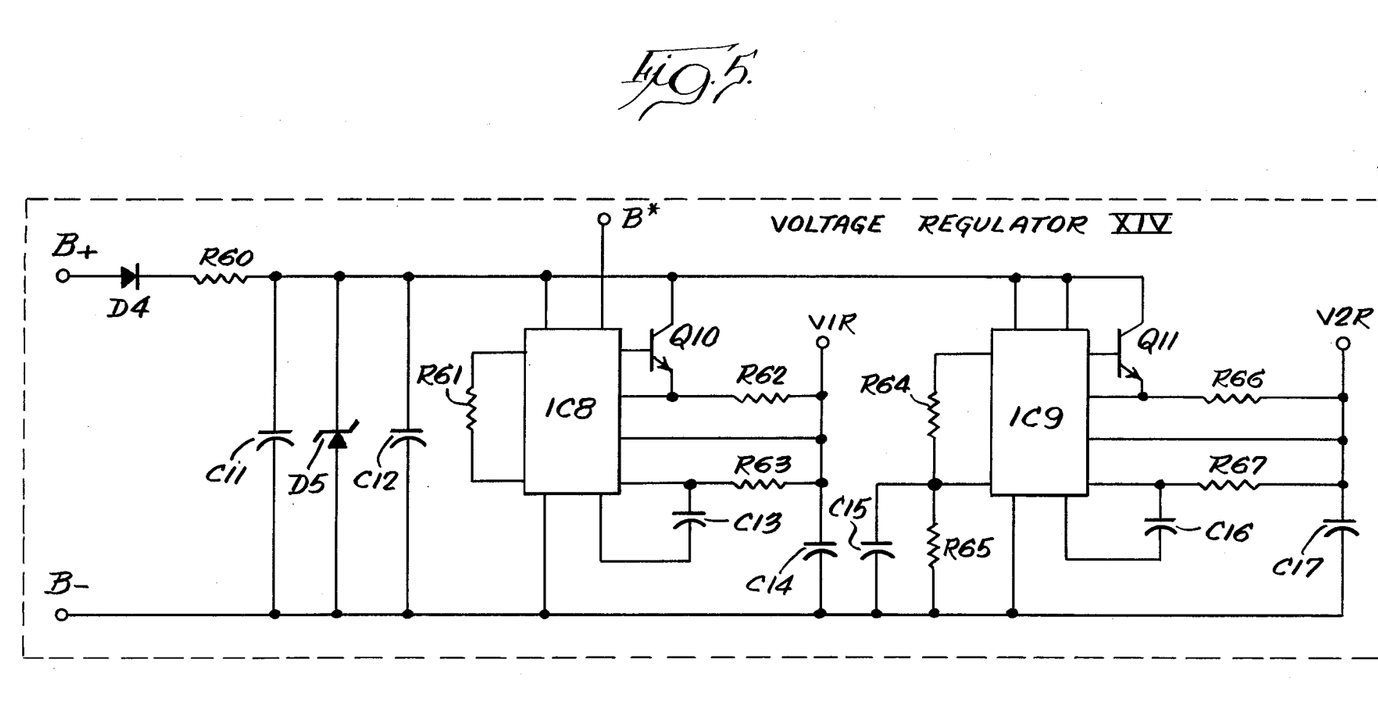
FIG. 5 is a schematic diagram of a voltage regulator suitable for use with the circuitry shown in FIGS. 4a, 4b and 4c.

The necessary dc control voltage for the circuitry is provided by a voltage regulator shown in FIG. 5 and operates off the vehicle bettery voltage to generate a nonregulated but filtered supply voltage B*, and two regulated voltages V1R and V2R as control system reference voltages. The voltage regulator input network includes diodes D4 and D5, resistor R60 and capacitors C11 and C12 to produce the filtered voltage B* as a sufficiently reliable supply voltage for the integrated circuits. Diode D4 protects the circuits from reverse voltage transients and the zenor diode D5 protects the circuits from excessive forward transients. The regulated reference voltages V1R and V2R are supplied by integrated circuit regulators IC-8 and IC-9 and associated bias and filtering components, R61–R63 and capacitors C13 and C14 for production of voltage V1R and resistors R64–R67 and capacitors C15–C17 for the production of regulated voltage V2R. Transistors Q10 and Q11 increase the current capabilities of the regulator circuits.

In one embodiment of the present invention, the values of the components shown and identified in FIGS. 4a, 4b, 4c and 5 are as follows:

| INTEGRATED CIRCUITS | | | |
|---|---|---|---|
| IC-1: | Fairchild | μA709 | Operational Amplifier |
| IC-2: | Signetics | 555 | Timer |
| IC-3: | Fairchild | μA741 | Operational Amplifier |
| IC-4A,B: | Fairchild | μA747 | " |
| IC-5A,B: | Fairchild | μA747 | " |
| IC-6A,B: | Fairchild | μA747 | " |
| IC-7: | Fairchild | μA741 | " |
| IC-8: | Fairchild | μA723 | Voltage Regulator |
| IC-9: | Fairchild | μA723 | " |

| TRANSISTORS | | | |
|---|---|---|---|
| Q1: | MPS 404 | PNP | Silicon |
| Q2: | MPS 706A | NPN | " |
| Q3: | 2N2218A | " | " |
| Q4: | 2N2102 | " | " |
| Q5: | TR50 | PNP | Power (IR) |
| Q6: | 2N2102 | NPN | Silicon |
| Q7: | TR50 | PNP | Power (IR) |
| Q8: | 2N2102 | NPN | Silicon |
| Q9: | TR50 | PNP | Power (IR) |
| Q10: | 2N2102 | NPN | Silicon |
| Q11: | 2N2102 | " | " |

| DIODES | | |
|---|---|---|
| D1: | IN4002 | Silicon |
| D2: | IN4002 | " |
| D3: | IN4002 | " |
| D4: | IN4002 | " |
| D5: | IN957 | Zener |

| VARIABLE RESISTORS | | | | |
|---|---|---|---|---|
| VR1: | 50K | ohm | potentiometer | (Single Turn Trimmer) |
| VR2: | 5K | " | " | (Single Turn/2 watts) |
| VR3: | 10K | " | " | (Single Turn Trimmer) |
| VR4: | 10K | " | " | (Single Turn Trimmer) |
| VR5: | 10K | " | " | (Single Turn Trimmer) |

| RESISTORS | | | | |
|---|---|---|---|---|
| R1: | 240 | ohms | ¼ watt | 5% |
| R2: | 22K | " | " | " |
| R3: | 470 | " | " | " |
| R4: | 33K | " | " | 1% |
| R5: | 49K | " | " | " |
| R6: | 332K | " | " | " |
| R7: | 22K | " | " | 5% |
| R8: | 22K | " | " | " |
| R9: | 4.7K | " | " | " |
| R10: | 4.7K | " | " | " |
| R11: | 4.7K | " | " | " |
| R12: | 49K | " | " | 1% |
| R13: | 47K | " | " | 5% |
| R14: | 4.7K | " | " | " |
| R15: | 49K | " | " | 1% |

-continued

RESISTORS

| | | | | |
|---|---|---|---|---|
| R16: | Selected | " | " | " |
| R17: | 49K | " | " | " |
| R18: | 100K | " | " | " |
| R19: | 47K | " | " | 5% |
| R20: | 51K | " | " | " |
| R21: | 100K | " | " | " |
| R22: | 39K | " | " | " |
| R23: | 100K | " | " | " |
| R24: | 100K | " | " | " |
| R25: | 100K | " | " | " |
| R26: | 39K | " | " | " |
| R27: | 100K | " | " | " |
| R28: | 100K | " | " | " |
| R29: | 100K | " | " | " |
| R30: | 39K | " | " | " |
| R31: | 3.3K | " | " | " |
| R32: | 100K | " | " | " |
| R33: | 39K | " | " | " |
| R34: | 1K | " | " | " |
| R35: | 1K | " | " | " |
| R36: | 100K | " | " | " |
| R37: | 100K | " | " | " |
| R38: | 100K | " | " | " |
| R39: | 51K | " | " | " |
| R40: | 10K | " | " | " |
| R41: | 10K | " | " | " |
| R42: | 560K | " | " | " |
| R43: | 2.7K | " | " | " |
| R44: | 1.2K | " | " | " |
| R45: | 150 | " | " | " |
| R46: | 100 | " | 1 watt | " |
| R47: | 10K | " | ½ watt | " |
| R48: | 10K | " | " | " |
| R49: | 560K | " | " | " |
| R50: | 2.7K | " | " | " |
| R51: | 150 | " | " | " |
| R52: | 1.2K | " | " | " |
| R53: | 100 | " | 1 watt | " |
| R54: | 10K | " | ½ watt | " |
| R55: | 1M | " | " | " |
| R56: | 2.7K | " | " | " |
| R57: | 150 | " | " | " |
| R58: | 1.2K | " | " | " |
| R59: | 100 | " | 1 watt | " |
| R60: | 0.47 | " | " | " |
| R61: | 1.2K | " | ½ watt | " |
| R62: | 4.7 | " | " | " |
| R63: | 1.87K | " | " | 1% |
| R64: | 2.15K | " | " | " |
| R65: | 4.99K | " | " | " |
| R66: | 4.7 | " | " | 5% |
| R67: | 1.4K | " | " | " |

CAPACITORS

| | | | | |
|---|---|---|---|---|
| C1 | 0.001 | μf | 25V | Ceramic |
| C2 | 0.001 | " | " | " |
| C3 | 0.01 | " | " | " |
| C4 | 0.047 | " | " | Mylar |
| C5 | 0.1 | " | " | Ceramic |
| C6 | 0.025 | " | " | " |
| C7 | 2 | " | " | Non-Polar Tantalum |
| C8 | 0.1 | " | " | Ceramic |
| C9 | 0.1 | " | " | " |
| C10 | 0.1 | " | " | " |
| C11 | 0.1 | " | " | " |
| C12 | 10 | " | " | Tantalum |
| C13 | 100 | pf | " | Ceramic |
| C14 | 0.1 | μf | " | " |
| C15 | 0.1 | " | " | " |
| C16 | 100 | pf | " | " |
| C17 | 0.1 | μf | " | " |

SYSTEM VOLTAGES

| | | | |
|---|---|---|---|
| B+ | 12 VDC | (Battery) | |
| B− | 0 VDC | (Ground) | |
| B* | 11 VDC | (Unregulated) | |
| V1R | 8 VDC | (Regulated Reference) | |
| V2R | 5 VDC | (Regulated Reference) | |

From the foregoing, it will be observed that numerous variations and modifications may be effected without departing from the true spirit and scope of the novel concept of the invention. It is, of course, intended to cover by the appended claims all such modifications as fall within the scope of the claims.

I claim:

1. An electrical control system for controlling the depth of a vehicle drawn implement of the type having means connecting the implement to the vehicle, hydraulic motor means operable to raise and lower the implement to change the depth thereof, electrically operated valve means for effecting operation of said hydraulic motor means, and means for indicating the values of selected ones of a plurality of variables including a desired depth of the implement, the actual depth of the implement, and the draft load, said control system generating control signals for operating said valve means as a function of the relationship between values of the variables, said control system comprising:

transducer means responsive to said indicating means for sensing the value of each of the selected variables;

first circuit means responsive to each of said transducer means for generating pulsating signals each having a pulse repetition rate which varies as a function of and is representative of the value of one of the selected variables;

second circuit means responsive to each of said representative pulsating signals for generating electrical signals each having an amplitude indicative of the value of one of the selected variables and varying in accordance with the pulse repetition rate of one of said representative pulsating signals;

third circuit means for algebraically combining said variable amplitude signals for producing a combined signal having a polarity and amplitude determined by the algebraic sum of said variable amplitude signals;

fourth circuit means responsive to said combined signal for generating valve control signals in response to said combined signal exceeding a selected amplitude and for applying said control signal to said valve means to effect operation of said hydraulic motor means to selectively raise or lower said implement as a function of the polarity of said combined signal.

2. A system as claimed in claim 1 wherein said transducer means is a variable inductance transducer means;

said transducer means including means for varying the inductance thereof as a function of the sensed indicated value of the variable; and said first circuit means includes oscillator means electrically connected to each of said transducer means for generating a plurality of signals each having a frequency proportional to the inductance of one of said transducer means.

3. A system as claimed in claim 2 wherein said first circuit means includes pulse generating means electrically connected to said oscillator means and responsive to each one of said variable frequency signals for generating each one of said representative pulsating signals having a pulse repetition rate determined by the frequency of said one variable frequency signals.

4. A system as claimed in claim 2 wherein said first circuit means includes pulse generating means electrically connected to said oscillator means and responsive to each one of said variable frequency signals for generating each one of said representative pulsating signals in the form of a plurality of constant amplitude constant duration pulses having a pulse repetition rate corresponding to the frequency of said one variable frequency signal.

5. A system as claimed in claim 1 including:
means for feeding back portions of said control signals to said third circuit means, whereby said third circuit means generates said combined signal having a polarity and amplitude determined by the algebraic sum of said variable amplitude signals and said feedback signals.

6. An electrical control system for controlling the depth of a vehicle drawn implement of the type having means connecting the implement to the vehicle, hydraulic motor means for raising and lowering the implement to change the depth thereof and electrically operated valve means for effecting operation of said hydraulic motor means, said control system generating a control signal for operating said valve means as a function of the relationship between values of implement position and load variables, said control system comprising:
means for determining the value of each of the variables, including variable inductance transducer means indicating the value of each variable for varying the inductance of a corresponding transducer means as a function of the value of the variable;
first circuit means responsive to each of said value determining means for generating signals, one representative of each of the variables, and for varying a selected characteristic of each of said representative signals as a function of the value of the variable and said signal is representative of means varying said selected characteristic of each of said representative signals as a function of the inductance of a corresponding transducer means, and means for generating each of said representative signals as a pulsating signal consisting of a plurality of constant width pulses having a characteristic which varies proportionally to the inductance of a corresponding transducer means,
second circuit means for generating a plurality of second signals, each in response to one of said representative signals, each of said second signals having an amplitude indicative of the value of a corresponding one of the variables and varying in accordance with said varying characteristic of said one representative signal;
third circuit means for algebraically combining said second signals for producing a combined signal having a polarity and amplitude determined by the algebraic sum of said second signals;
fourth circuit means responsive to said combined signal for generating a valve control signal in response to said combined signal exceeding a selected amplitude, for applying said signal to said valve means to effect operation of said hydraulic motor means to selectively raise or lower said implement as a function of the polarity of said combined signal, and for terminating said control signal in response to said combined signal amplitude decreasing below another amplitude less than said selected amplitude.

7. An electrical control system for controlling the depth of a vehicle drawn implement of the type having means connecting the implement to the vehicle, hydraulic motor means for raising and lowering the implement to change the depth thereof and electrically operated valve means for effecting operation of said hydraulic motor means, said control system generating a control signal for operating said valve means as a function of the relationship between values of implement position and load variables, said control system comprising:
means for determining the value of each of the variables, including variable inductance transducer means, means indicating the value of each variable for varying the inductance of a corresponding transducer means as a function of the value of the variable;
first circuit means responsive to each of said value determining means for generating signals, one representative of each of the variables, and for varying a selected characteristic of each of said representative signals as a function of the value of the variable said signal is representative of means varying said selected characteristic of each of said representative signals as a function of the inductance of a corresponding transducer means, oscillating circuit means incorporating each of said transducer means for generating a plurality of oscillating signals, each having a frequency proportional to the inductance of said transducer means and pulse generating means responsive to each of said oscillating signals for generating each of said representative signals as a plurality of pulses of constant amplitude and constant width and having a pulse repetition rate determined by the frequency of said oscillating signal;
second circuit means for generating a plurality of second signals, each in response to one of said representative signals, each of said second signals having an amplitude indicative of the value of a corresponding one of the variables and varying in accordance with said varying characteristic of said one representative signal;
third circuit means for algebraically combining said second signals for producing a combined signal having a polarity and amplitude determined by the algebraic sum of said second signals;
fourth circuit means responsive to said combined signal for generating a valve control signal in response to said combined signal exceeding a selected amplitude, and for applying said signal to said valve means to effect operation of said hydraulic motor means to selectively raise or lower said implement as a function of the polarity of said combined signal, and for terminating said control signal in response to said combined signal amplitude decreasing below another amplitude less than said selected amplitude.

8. An electrical control system as claimed in claim 7 wherein said second circuit means generates each of said second signals having an amplitude determined by and varying proportionally to the pulse repetition rate of one of said pulsating signals,
whereby the amplitude of each of said second signals is indicative of the value of a corresponding variable.

9. An electrical control system as claimed in claim 6 wherein one of said variables is an independent variable and another of said variables is a dependent variable,
said third circuit means including means responsive to each of said second signals for effectively imparting a first polarity to one of said second signals indicative of said independent variable and for effectively imparting a second polarity to another of said second signals indicative of said dependant variable, whereby the polarity and amplitude of said combined signal is determined by the relationship between the values of said independent variable and said dependant variable.

10. An electrical control system as claimed in claim 9 including feedback circuit means for connecting said control signal to said third circuit means,
said third circuit means including means for effectively imparting a polarity to said feedback control signal to reduce the amplitude of said combined signal.

* * * * *